US007387856B2

(12) United States Patent
Chari et al.

(10) Patent No.: US 7,387,856 B2
(45) Date of Patent: Jun. 17, 2008

(54) DISPLAY COMPRISING LIQUID CRYSTAL DROPLETS IN A HYDROPHOBIC BINDER

(75) Inventors: Krishnan Chari, Fairport, NY (US); Debasis Majumdar, Rochester, NY (US)

(73) Assignee: Industrial Technology Research Institute, Hsinchu (TW)

( * ) Notice: Subject to any disclaimer, the term of this patent is extended or adjusted under 35 U.S.C. 154(b) by 307 days.

(21) Appl. No.: 11/156,866

(22) Filed: Jun. 20, 2005

(65) Prior Publication Data
US 2006/0286309 A1 Dec. 21, 2006

(51) Int. Cl.
*C09K 19/00* (2006.01)
*C09K 19/52* (2006.01)

(52) U.S. Cl. .................. 430/20; 428/1.1; 428/1.2; 252/299.01; 349/176

(58) Field of Classification Search .............. 430/20; 252/299.01; 428/1.1, 1.2; 349/176
See application file for complete search history.

(56) References Cited

U.S. PATENT DOCUMENTS

| 4,435,047 | A | 3/1984 | Fergason |
| 4,688,900 | A | 8/1987 | Doane et al. |
| 4,806,922 | A | 2/1989 | McLaughlin et al. |
| 5,363,482 | A | 11/1994 | Victor et al. |
| 5,835,174 | A | 11/1998 | Clikeman et al. |
| 6,271,898 | B1 | 8/2001 | Clikeman et al. |
| 6,423,368 | B1 | 7/2002 | Stephenson et al. |
| 6,704,073 | B2 | 3/2004 | Stephenson et al. |
| 2003/0137717 | A1 | 7/2003 | Albert et al. |
| 2004/0217929 | A1 | 11/2004 | Albert et al. |
| 2004/0226820 | A1 | 11/2004 | Webber et al. |
| 2006/0134564 | A1* | 6/2006 | Chari et al. ................. 430/330 |
| 2006/0215077 | A1* | 9/2006 | Majumdar et al. ............ 349/88 |

OTHER PUBLICATIONS

U.S. Appl. No. 10/718,900, filed Nov. 21, 2003, Chari et al.
U.S. Appl. No. 11/017,181, filed Dec. 20, 2004, Chari et al.
Drzaic, P.S. in Liquid Crystal Dispersions, pp. 30-51, published by World Scientific, Singapore (1995).
Whitesides and Ross (J. Colloid Interface Sci. 169, pp. 48-59 (1995)).
Rudhardt et al. (Applied Physics Letters vol. 82, pp. 2610-2612, 2003).

* cited by examiner

*Primary Examiner*—Geraldina Visconti
(74) *Attorney, Agent, or Firm*—Akin, Gump, Strauss, Hauer & Feld LLP

(57) ABSTRACT

The present invention relates to a display comprising at least one substrate and at least one electronically modulated imaging layer and at least one electrically conductive layer, wherein the electronically modulated imaging layer comprises a self-assembled, close-packed, ordered monolayer of domains of electrically modulated material in a water insoluble, hydrophobic polymer matrix and the at least one electrically conductive layer comprises electronically conductive polymer and a conductivity enhancing agent.

19 Claims, 1 Drawing Sheet

DISPLAY COMPRISING LIQUID CRYSTAL DROPLETS IN A HYDROPHOBIC BINDER

FIELD OF THE INVENTION

The present invention relates to the use of hydrophobic binders in electronic displays

BACKGROUND OF THE INVENTION

There is significant interest in low cost flexible electronic displays. Typically, such displays comprise a light modulating component embedded in a binder (most commonly polymer) matrix that is coated over a conductive plastic support. Broadly speaking, a light modulating component is a material that changes its optical properties such as its ability to reflect or transmit light in response to an electric field. The light modulating component may be a liquid crystalline material such as a nematic liquid crystal, a chiral nematic or cholesteric liquid crystal or a ferroelectric liquid crystal. The light modulating material may also be a water insoluble liquid containing particles that undergo electrophoresis or motion such as rotation or translation in response to an electric field. Displays comprising a liquid crystalline material in a polymer matrix are referred to as polymer dispersed liquid crystal (PDLC) displays.

There are two main methods for fabricating polymer dispersed liquid crystal devices: emulsion methods and phase separation methods. Emulsion methods have been described in U.S. Pat. Nos. 4,435,047 and 5,363,482. The liquid crystal is mixed with an aqueous solution containing polymer. The liquid crystal is insoluble in the continuous phase and an oil-in-water emulsion is formed when the composition is passed through a suitable shearing device, such as a homogenizer. The emulsion is coated on a conductive surface and the water allowed to evaporate. A second conductive surface may then be placed on top of the emulsion or imaging layer by lamination, vacuum deposition, or screen printing to form a device. While the emulsion methods are straightforward to implement, droplet size distributions tend to be broad resulting in a loss in performance. For cholesteric liquid crystal devices, also referred to herein as CLC devices, this typically means reduced contrast and brightness. Phase separation methods were introduced in an effort to overcome this difficulty.

Phase separation methods have been outlined in U.S. Pat. No. 4,688,900 and in Drzaic, P. S. in Liquid Crystal Dispersions, pgs. 30-51, published by World Scientific, Singapore (1995). The liquid crystal and polymer, or precursor to the polymer, are dissolved in a common organic solvent. The composition is then coated on a conductive surface and induced to phase separate by application of ultraviolet (UV) radiation or by the application of heat or by evaporation of the solvent, resulting in droplets of liquid crystal in a solid polymer matrix. A device may then be constructed utilizing this composition. Although phase separation methods produce dispersed droplets having more uniform size distributions, there are numerous problems with this approach. For example, the long term photostability of photopolymerized systems is a concern due to the presence of photoinitiators that produce reactive free radicals. Photoinitiators not consumed by the polymerization process can continue to produce free radicals that can degrade the polymer and liquid crystals over time. Furthermore, it is also known that ultraviolet radiation is harmful to liquid crystals. Specifically, exposure to ultraviolet radiation can lead to decomposition of the chiral dopant in a cholesteric liquid crystal mixture, resulting in a change in the reflected color. The use of organic solvents may also be objectionable in certain manufacturing environments.

U.S. Pat. Nos. 6,423,368 and 6,704,073 propose to overcome the problems associated with the prior art methods through the use of droplets of the liquid crystal material prepared using a limited coalescence process. In this process, the droplet-water interface is stabilized by particulate species, such as colloidal silica. Surface stabilization by particulate species such as colloidal silica is particularly preferred as it can give narrow size distribution and the size of the droplets can be controlled by the concentration of the particulate species employed. The materials prepared via this process are also referred to as Pickering Emulsions and are described more fully by Whitesides and Ross (J. Colloid Interface Sci. 169, 48 (1995)). The uniform droplets may be combined with a suitable binder and coated on a conductive surface to prepare a device. The process provides improvement in brightness and contrast over prior art processes. It also overcomes some of the problems associated with photoinitiators and ultraviolet radiation. However, there is still much room for improvement, particularly in terms of the switching voltage or the voltage needed to change the orientation of the liquid crystal from one state to another. The latter has a significant effect on the overall cost of the display. A low switching voltage is extremely desirable for low cost displays.

The device described by U.S. Pat. Nos. 6,423,368 and 6,704,073 suffers from drawbacks because of the structure of the coated layer. Undesirably, there may be more than a monolayer of droplets between the two electrodes. Furthermore, the process of coating a heated emulsion of the liquid crystal in a gelatin binder onto a substrate with a conductive layer and subsequently lowering the temperature of the coating to change the state of the coated layer from a free flowing liquid to a gel state (referred to as a sol-gel transition) prior to drying the coating results in an extremely uneven distribution of droplets of liquid crystal. At the microscopic scale there are regions of the coating containing overlapping droplets and other regions with no droplets at all between the electrodes. The uneven distribution of droplets results in a decrease in contrast and an increase in switching voltage.

U.S. Pat. Nos. 6,271,898 and 5,835,174 also describe compositions suitable for flexible display applications that employ very uniform sized droplets of liquid crystal in a polymer binder. However, no attempt is made to control the thickness or the distribution of droplets in the coated layer resulting in less than optimum performance.

U.S. patent application Ser. No. 10/718,900 shows that the maximum contrast in a bistable chiral nematic liquid crystal display prepared by the limited coalescence method is obtained when the uniform liquid crystal domains or droplets are coated as substantially a monolayer on the conductive support. The bistable states in these chiral nematic liquid crystal displays are the planar reflecting state and the weakly scattering focal conic state. Back-scattering of light from the weakly scattering focal conic state increases drastically when there is more than a monolayer of droplets between the conductive surfaces. While the method provides displays with an improvement in brightness and contrast, it still falls short of optimum performance because the gelatin binder is made to undergo a sol-gel transition prior to drying of the coating resulting in an uneven structure.

Rudhardt et al. (Applied Physics Letters vol. 82, page 2610, 2003) describe a method of fabricating a light modulating device wherein a composition containing very uniform droplets of liquid crystal in an aqueous solution of polymer binder is spread on an indium tin oxide (ITO) coated glass surface and the water allowed to evaporate. The droplets of liquid crystal spontaneously self-assemble into a hexagonal close-packed (HCP) monolayer. A second indium tin oxide coated glass surface is placed over the coated layer of droplets as the top electrode to complete construction of the device. A uniform monolayer thickness is achieved for the coated layer and the close-packed distribution of droplets is also extremely well defined. Both features result in a low switching voltage. However, there are numerous problems with this approach. Firstly, the uniform droplets of liquid crystal are prepared by extrusion through a thin capillary into a flowing fluid. When a droplet at the tip of the capillary grows to reach critical size, viscous drag exceeds surface tension and breakoff occurs, producing highly monodisperse emulsions. Clearly, this method of creating one droplet at a time is not suitable for large scale manufacture. Secondly, the method by which the second (top) electrode is applied may be suitable for construction of small scale displays on rigid substrates such as glass but is not viable for large area low cost displays on flexible substrates. A single substrate approach wherein the second electrode is simply coated or screen printed is preferable to a two substrate approach wherein the second electrode is prepared separately and then contacted by lamination.

U.S. Pat. Publication Nos. 2003/0137717A1 and U.S. Pat. Publication Nos. 2004/0217929A 1 indicate that a close-packed monolayer of droplets of the light modulating component may be desirable for obtaining high brightness and contrast in a polymer dispersed electrophoretic display. However the method of making droplets described in these applications is a standard emulsification process that does not result in emulsions having a narrow size distribution that is desirable for obtaining close-packed monolayers by spontaneous self-assembly. The preferred method of preparing droplets in U.S. Pat. Publication Nos. 2003/0137717A1 and U.S. Pat. Publication Nos. 2004/0217929A1 also involves encapsulation resulting in droplets or capsules in the size range of 20 to 200 microns with wall thickness of 0.2 to 10 microns. The relatively large droplet size and wall thickness result in high switching voltages. The latter is particularly a problem for bistable cholesteric liquid crystal devices. Encapsulation is clearly not desirable but these applications do not teach how a second conducting layer is to be applied on top of the coated layer of droplets in the absence of encapsulation. In the absence of encapsulation, droplets of the light modulating component may directly come in contact with the organic solvent in the screen printed conducting ink leading to contamination or poisoning of the light modulating component. This is particularly a concern if the light modulating component is a liquid crystal material.

To overcome the difficulties of U.S. Pat. Publication Nos. 2003/0137717A1 and U.S. Pat. Publication Nos. 2004/0217929A1, U.S. Pat. Publication Nos. 2004/0226820A1 teaches that a close-packed monolayer of droplets may be obtained by using electro-deposition followed by washing after the droplets have been spread on a suitable surface using a coating knife or coating head such as a slot die coating head. However, the additional steps of electro-deposition and washing are cumbersome and not suitable for manufacturing on a large scale. Even with these additional steps, a close-packed monolayer of uniform thickness is not achieved. The root mean square (RMS) surface roughness is about 6 microns because of non-uniform droplets or capsules. This is a very high value of surface roughness that would result in irregular or incomplete curing if a ultraviolet curable screen-printed conducive ink is used as the second electrode. The irregular curing will result in increased switching voltages. Furthermore, a surface roughness of this magnitude will also result in significant non-uniformity of switching voltage across the area of the display since the switching voltage is directly related to the thickness of the coated layer.

U.S. patent application Ser. No. 11/017181 describes a novel method for polymer dispersed liquid crystal that overcomes the problems of the prior art. A uniform dispersion of liquid crystal droplets is prepared by the limited coalescence process. The droplets are mixed with a suitable binder and coated and dried on a flexible conductive support at a temperature above the sol-gel transition of the binder. The uniform droplets of liquid crystal spontaneously self-assemble to create a close-packed monolayer. The desired close-packed structure is then fixed or preserved by cross-linking the binder. Subsequently, a second aqueous layer containing gelatin is coated above the liquid crystal layer and allowed to dry at a temperature that is below the sol-gel transition of the binder. This second layer protects the liquid crystal material from the solvent in the conductive ink. A conductive ink is screen printed over this layer to complete construction of the device. The device may be manufactured using a low-cost process. Furthermore, it exhibits low switching voltage as well as good contrast and brightness. However, there is still room for improvement. In particular, it would be preferable to eliminate the need for cross-linking the binder after the liquid crystal layer has been applied in an effort to reduce process time. Furthermore, since switching voltage is directly proportional to thickness between the electrodes, elimination of the protective layer between the liquid crystal layer and the second electrode is also desirable.

U.S. Pat. No. 4,806,922 describes a method for polymer dispersed liquid crystals that uses polymer latex as the binder material in the layer containing the liquid crystal. But, once again, the method of making the droplets of liquid crystal is a standard emulsification process that does not result in emulsions having the narrow size distribution necessary for obtaining a close-packed monolayer by spontaneous self-assembly.

U.S. patent application Ser. No. 11/017181 also describes a method for polymer dispersed liquid crystals that uses polymer latex as binder material. In this case a limited coalescence process is used to prepare very uniform droplets of liquid crystal. However, in spite of this, the display exhibits high switching voltage that is undesirable.

In summary, the prior art describes a water soluble liquid crystal layer. The close-packed architecture of this layer is destroyed if an aqueous layer is coated above it in the absence of fixing or cross-linking. Also, solvent borne conductive layers cannot be directly coated on top of the liquid crystal layer as contact between liquid crystal and solvent may cause irreversible damage to the liquid crystal. A proposed solution to this problem lies in coating a protective barrier between the water soluble liquid crystal layer and the solvent-borne conductive layer. Unfortunately, this additional layer results in the need for increased voltage. Clearly, there is a need for a low-cost display based on water insoluble, hydrophobic binder material that exhibits low switching voltage as well as good contrast and brightness. There is also a need for a low-cost display having reduced thickness between the electrodes.

PROBLEM TO BE SOLVED

There remains a need for a reduced cost, display having excellent brightness, high contrast, and low switching voltage.

SUMMARY OF THE INVENTION

The present invention relates to a display comprising at least one substrate and at least one electronically modulated imaging layer and at least one electrically conductive layer, wherein the electronically modulated imaging layer comprises a self-assembled, close-packed, ordered monolayer of domains of electrically modulated material in a water insoluble, hydrophobic polymer matrix and the at least one electrically conductive layer comprises electronically conductive polymer and a conductivity enhancing agent.

ADVANTAGEOUS EFFECT OF THE INVENTION

The present invention includes several advantages, not all of which are incorporated in a single embodiment. A display according to the present invention would be low cost and require low switching voltage. In the case of a cholesteric or chiral nematic liquid crystal display, the resulting display is expected to have reflectance closer to the theoretical limit of 50% and higher contrast. The use of a hydrophobic binder produces a self-assembled monolayer of droplets of the electro-optic material that is not disturbed when contacted with a second aqueous layer. The use of the electronically conductive polymer provides a conductor that can be coated directly over the liquid crystal layer. The inclusion of the conductivity enhancing agent (CEA) in the coating composition comprising the conductive layer results in enhanced conductivity.

DETAILED DESCRIPTION OF THE INVENTION

Figure 1:
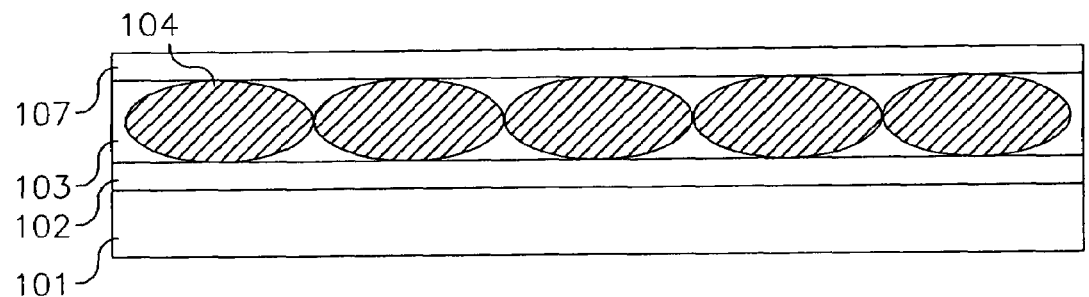
FIG. 1 illustrates a display based on an embodiment of the invention which is a micrograph showing substantial preservation of close-packed structure after application of a second layer containing conductive polymer PEDOT.

The present invention relates to a high contrast reflective display comprising at least one substrate, at least one electrically conductive layer and at least one close-packed, ordered monolayer of domains of electrically modulated material in a water insoluble, hydrophobic polymer matrix and a method of making the same. In the preferred embodiment, the electrically modulated material is a chiral nematic liquid crystal incorporated in a polymer matrix. The preferred water insoluble hydrophobic polymer is a polymer latex. By water insoluble, it is meant that the polymer is dispersible in aqueous media, but is not soluble in water or the liquid crystal material.

Chiral nematic liquid crystalline materials may be used to create electronic displays that are both bistable and viewable under ambient lighting. Furthermore, the liquid crystalline materials may be dispersed as micron sized droplets in an aqueous medium, mixed with a suitable binder material and coated on a flexible conductive support to create potentially low cost displays. The operation of these displays is dependent on the contrast between the planar reflecting state and the weakly scattering focal conic state. In order to derive the maximum contrast from these displays, it is desired that the chiral nematic liquid crystal domains or droplets are spread on a conductive support as a close-packed ordered monolayer.

It is possible to prepare such an ordered monolayer by first applying an aqueous dispersion of chiral nematic liquid crystal domains to the substrate in the presence of a suitable binder, allowing the domains or droplets to self-assemble into a close-packed ordered monolayer, preferably a hexagonal close-packed (HCP) monolayer, and then allowing the binder material to set or become fixed to preserve the close-packed ordered monolayer structure so that other layers can be spread above the imaging layer without affecting the close-packed structure.

In general, the light modulating imaging layer contains electrically modulated material domains dispersed in a binder. For purposes of the present invention, domains are defined to be synonymous with micelles and/or droplets. The electrically modulated material may be electrochromic material, rotatable microencapsulated microspheres, liquid crystal materials, cholesteric/chiral nematic liquid crystal materials, polymer dispersed liquid crystals (PDLC), polymer stabilized liquid crystals, surface stabilized liquid crystals, smectic liquid crystals, ferroelectric material, electroluminescent material or any other of a very large number of light modulating imaging materials known in the prior art. The domains of the electrically modulated imaging layer include droplets having uniform domain size, with few, if any, parasitic domains, which are domains with random or uncontrolled sizes and which have undesirable electro-optical properties, within the dried coatings, as described in previous patent art.

The display includes a suitable electrically modulated material disposed on a suitable support structure, for example, on or between one or more electrodes. The term "electrically modulated material" as used herein is intended to include any suitable nonvolatile material. Suitable materials for the electrically modulated material are described in U.S. patent application Ser. No. 09/393,553 and U.S. Provisional Patent Application Ser. No. 60/099,888, incorporated herein by reference.

The electrically modulated material may also be an arrangement of particles or microscopic containers or microcapsules. Each microcapsule contains an electrophoretic composition of a fluid, such as a dielectric or emulsion fluid, and a suspension of colored or charged particles or colloidal material. According to one practice, the particles visually contrast with the dielectric fluid. According to another example, the electrically modulated material may include rotatable balls that can rotate to expose a different colored surface area, and which can migrate between a forward viewing position and/or a rear nonviewing position, such as gyricon. Specifically, gyricon is a material comprised of twisting rotating elements contained in liquid filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon materials are disclosed in U.S. Pat. Nos. 6,147,791, 4,126,854 and U.S. Pat. No. 6,055,091, the contents of which are herein incorporated by reference.

According to one practice, the microcapsules may be filled with electrically charged white particles in a black or colored dye. Examples of electrically modulated material suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The electrically modulated material may also include material disclosed in U.S. Pat. No. 6,025,896, the contents of which are incorporated herein by reference. This material comprises charged particles in a liquid dispersion medium encapsulated in a large number of microcapsules. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material.

The electrically modulated material may include a thermochromic material. A thermochromic material is capable of changing its state alternately between transparent and opaque upon the application of heat. In this manner, a thermochromic imaging material develops images through the application of heat at specific pixel locations in order to form an image. The thermochromic imaging material retains a particular image until heat is again applied to the material. Since the rewritable material is transparent, ultraviolet fluorescent printings, designs and patterns underneath can be seen through.

The electrically modulated material may also include surface stabilized ferrroelectric liquid crystals (SSFLC). Surface stabilized ferroelectric liquid crystals confining ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bistable nonvolatile imaging materials are available and may be implemented in the present invention.

The electrically modulated material may also be configured as a single color, such as black, white or clear, and may be fluorescent, iridescent, bioluminescent, incandescent, ultraviolet, infrared, or may include a wavelength specific radiation absorbing or emitting material. There may be multiple layers of electrically modulated material. Different layers or regions of the electrically modulated material may have different properties or colors. Moreover, the characteristics of the various layers may be different from each other. For example, one layer can be used to view or display information in the visible light range, while a second layer responds to or emits ultraviolet light. The nonvisible layers may alternatively be constructed of nonelectrically modulated material based materials that have the previously listed radiation absorbing or emitting characteristics. The electrically modulated material employed in connection with the present invention preferably has the characteristic that it does not require power to maintain display of indicia.

The most preferred electrically modulated material is a light modulating material, such as a liquid crystalline material. The liquid crystalline material can be one of many different liquid crystal phases such as; nematic (N), chiral nematic (N*), or smectic, depending upon the arrangement of the molecules in the mesophase. Chiral nematic liquid crystal (N*LC) displays are preferably reflective, that is, no backlight is needed, and can function without the use of polarizing films or a color filter.

Chiral nematic liquid crystal refers to the type of liquid crystal having finer pitch than that of twisted nematic and super twisted nematic used in commonly encountered liquid crystal devices. Chiral nematic liquid crystals are so named because such liquid crystal formulations are commonly obtained by adding chiral agents to host nematic liquid crystals. Chiral nematic liquid crystals may be used to produce bistable or multi-stable displays. These devices have significantly reduced power consumption due to their nonvolatile "memory" characteristic. Since such displays do not require a continuous driving circuit to maintain an image, they consume significantly reduced power. Chiral nematic displays are bistable in the absence of a field, the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known liquid crystal devices (LCDs) include chemically etched, transparent, conductive layers overlying a glass substrate as described in U.S. Pat. No. 5,667,853, incorporated herein by reference. Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory.

Modern chiral nematic liquid crystal materials usually include at least one nematic host combined with a chiral dopant. In general, the nematic liquid crystal phase is composed of one or more mesogenic components combined to provide useful composite properties. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxyiic acid and of cyclohexylcyclohexanecarboxylic acid, phenyl cyclohexanes, cyclohexyibiphenyls, phenyl cyclohexylcyclohexanes, cyclohexylcyclohexanes, cyclohexylcyclohexenes, cyclohexylcyclohexylcyclohexenes, 1,4-bis-cyclohexylbenzenes, 4,4-bis-cyclohexylbiphenyls, phenyl- or cyclohexylpyrimidines, phenyl- or cyclohexylpyridines, phenyl- or cyclohexylpyridazines, phenyl- or cyclohexyidioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl) ethanes, 1-cyclohexyl-2', 2-biphenylethanes, 1-phenyl-2-cyclohexylphenylethanes, optionally halogenated stilbenes, benzyl phenyl ethers, tolanes, substituted cinnamic acids and esters, and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'—X—Y—Z—R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, -B-Phe- and -B-Cyc-, wherein Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl)ethyl, pyrimidine-2,5-diyl, pyridine-2,5-diyl or 1,3-dioxane-2,5-diyl. Y in these compounds is selected from the following bivalent groups —CH=CH—, —C≡C—, —N=N(O)—, —CH=CY'—, —CH=N(O)—, —CH2—CH2—, —CO—O—, —CH2—O—, —CO—S—, —CH2—S—, —COO—Phe—COO— or a single bond, with Y' being halogen, preferably chlorine, or —CN, R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in light modulating liquid crystal compositions. Chiral nematic liquid crystal materials and cells, as well as polymer stabilized chiral nematic liquid crystals and cells, are well known in the art and described in, for example, U.S. patent application Ser. No. 07/969,093, Ser. No. 08/057,662, Yang et al., Appl. Phys. Lett. 60(25) pp 3102-04 (1992), Yang et al., J. Appl. Phys. 76(2) pp 1331 (1994), published International Patent Application No. PCT/US92/09367, and published International Patent Application No. PCT/US92/03504, all of which are incorporated herein by reference.

Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: for example, G. Gottarelli and G. Spada, *Mol. Cryst. Liq. Crys.*, 123, 377 (1985), G. Spada and G. Proni, *Enantiomer*, 3, 301 (1998) and references therein. Typical well known dopant classes include 1,1-binaphthol derivatives, isosorbide and similar isomannide esters as disclosed in U.S. Pat. No. 6,217,792, TADDOL derivatives as disclosed in U.S. Pat. No. 6,099,751, and the pending spiroindanes esters as disclosed in U.S. patent application Ser. No. 10/651,692 by T. Welter et al., filed Aug. 29, 2003, titled "Chiral Compounds And Compositions Containing The Same," hereby incorporated by reference.

The pitch length of the liquid crystal materials may be adjusted based upon the following equation (1):

$$\lambda_{max} = n_{av} p_0$$

where $\lambda_{max}$ is the peak reflection wavelength, that is, the wavelength at which reflectance is a maximum, $n_{av}$ is the average index of refraction of the liquid crystal material, and $P_0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP \cdot c)$$

where c is the concentration of the chiral dopant and HTP is the proportionality constant.

For some applications, it is desired to have liquid crystal mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand held PCs, PDAs, e-books, camcorders, satellite navigation systems, store and supermarket pricing systems, highway signs, informational displays, smart cards, toys, and other electronic devices.

The liquid crystalline droplets or domains are typically dispersed in a continuous binder. In one embodiment, a chiral nematic liquid crystal composition may be dispersed in a continuous polymeric matrix. Such materials are referred to as "polymer dispersed liquid crystal" materials or "PDLC" materials.

Aqueous suspensions of polymer latex particles are also suitable as binder. The latex particles may be based on any suitable monomer or monomers such as urethane, styrene, vinyl toluene, p-chlorostyrene, vinyl napththalene, ethylenically unsaturated mono-olefins, such as ethylene, propylene, butylene, and isobutylene; vinyl halides such as vinyl chloride, vinyl bromide, vinyl fluoride, vinyl acetate, vinyl propionate, vinyl benzoate and vinyl butyrate; esters of alpha-methylene aliphatic mono-carboxylic acids such as methyl acrylate, ethyl acrylate, n-butyl acrylate, isobutylacrylate, dodecyl acrylate, n-octyl acrylate, 2-choloroethyl acrylate, phenyl acrylate, methyl-alpha-chloroacrylate, methyl methacrylate, ethyl methacrylate and butyl methacrylate; acrylonitrile, methacrylonitrile, acrylamide, vinyl ethers such as vinyl methyl ether, vinyl isobutyl ether and vinyl ethyl ether; vinyl ketones such as vinyl methylketone, vinyl hexyl ketone and methyl isopropyl ketone; vinylidene halides such as vinylidene chloride and vinylidene chlorofluoride; and N-vinyl compounds such as N-vinyl pyrrole, N-vinyl carbazole, N-vinyl indole and N-vinyl pyrrolidone divinyl benzene, ethylene glycol dimethacrylate mixtures thereof; and the like. Also preferred are aqueous suspensions of polyesters and polyolefins. The use of aqueous suspensions of polymer latex particles as binder is preferred. The most preferred polymer latex is polyurethane latex.

It is desirable that the binder has a low ionic content. The presence of ions in such a binder hinders the development of an electrical field across the dispersed liquid crystal material. Additionally, ions in the binder can migrate in the presence of an electrical field, chemically damaging the light modulating layer. The coating thickness, size of the liquid crystal domains, and concentration of the domains of liquid crystal materials are designed for optimum optical properties. Heretofore, the dispersion of liquid crystals is performed using shear mills or other mechanical separating means to form domains of liquid crystal within light modulating layer.

A conventional surfactant can be added to the emulsion to improve coating of the layer. Surfactants can be of conventional design, and are provided at a concentration that corresponds to the critical micelle concentration (CMC) of the solution. A preferred surfactant is Aerosol OT, commercially available from Cytec Industries, Inc.

Suitable prior art binders are water-soluble polymers that include both naturally occurring substances such as proteins, protein derivatives, cellulose derivatives (for example cellulose esters), gelatins and gelatin derivatives, polysaccaharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Prior art binders may be a component of the inventive system, provided that they are present in an amount and location so as not to effect the hydrophobic character of the inventive binder.

In a preferred embodiment, the liquid crystal is coated and dried to optimize the optical properties of the light modulating layer. In one embodiment, the layer is coated to provide a final coating containing a substantial monolayer of chiral nematic liquid crystal domains. The term "substantial monolayer" is defined by the Applicants to mean that, in a direction perpendicular to the plane of the display, there is no more than a single layer of domains sandwiched between the electrodes over 90% of the area of the display (or the imaging layer).

The amount of material needed for a monolayer can be determined by calculation based on individual domain size. Furthermore, improved viewing angle and broadband features may be obtained by appropriate choice of differently doped domains based on the geometry of the coated droplet and the Bragg reflection condition.

After coating and drying the latex particles coalesce to form a continuous film containing the droplets of liquid crystal. This film is not disturbed if a second aqueous layer is coated above it thereby eliminating the need for cross-linking. A crosslinking agent or hardener may be used to preserve the architecture of the close-packed monolayer of coated droplets after it has been formed by self-assembly if a water-soluble polymer is used as binder.

The liquid crystalline droplets or domains may be formed by any method, known to those of skill in the art, which will allow control of the domain size. For example, Doane et al. (*Applied Physics Letters*, 48, 269 (1986)) disclose a polymer dispersed liquid crystal comprising approximately 0.4 μm droplets of nematic liquid crystal 5CB in a polymer binder. A phase separation method is used for preparing the polymer dispersed liquid crystal. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a polymer dispersed liquid crystal comprising a chiral nematic mixture in a polymer binder. Once again a phase separation method is used for preparing the polymer dispersed liquid crystal. The liquid crystal material and polymer (a hydroxy functionalized polymethylmethacrylate) along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments.

In a preferred embodiment, a method referred to as "limited coalescence" is used to form uniformly sized emulsions of liquid crystalline material. For example, the liquid crystal material can be homogenized in the presence of finely divided silica, a coalescence limiting material, such as LUDOX® from DuPont Corporation. A promoter material can be added to the aqueous bath to drive the colloidal particles to the liquid-liquid interface. In a preferred embodiment, a copolymer of adipic acid and 2-(methylamino)ethanol can be used as the promoting agent in the water bath. The liquid crystal material can be dispersed using ultrasound to create liquid crystal domains below 1 micron in size. When the ultrasound energy is removed, the liquid crystal material coalesces into domains of uniform size. The limited coalescence process is described more fully by Whitesides and Ross (J. Colloid Interface Sci. 169, 48 (1995)), by Giermanska-Kahn, Schmitt, Binks and Leal-Calderon (Langmuir, 18, 2515 (2002)), and U.S Pat. No. 6,556,262, all incorporated herein by reference.

The distribution of droplet sizes is such that the coefficient of variation (cv) defined as the standard deviation of the distribution divided by the arithmetic mean is less than 0.25, preferably less than 0.2 and most preferably less than 0.15.

The limited coalescent materials can be coated using a photographic emulsion coating machine onto sheets of polyester having an indium tin oxide coating with a sheet conductivity of 300 Ohms per square. The coating can be dried to provide a polymerically dispersed cholesteric coating. By using limited coalescence, there are few, if any, parasitic smaller domains (having undesirable electro-optical properties) within the dried coatings.

The size ranges of domains in the dried coating are varied as the mixture dries and the domains flatten. In one embodiment, the resulting domains are flattened by the drying process and have on average a thickness substantially less than their length. The flattening of the domains can be achieved by proper formulation and sufficiently rapid drying of the coating.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried. Most preferably the imaging layer or light modulating layer has a thickness between 2 to 6 microns, particularly if the light modulating material is a chiral nematic liquid crystal.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

In U.S. Pat. Nos. 3,600,060, incorporated herein by reference, the domains of the dried light modulating material had particle size varying in diameter by a ratio of 10:1. This creates large domains and smaller parasitic domains. Parasitic domains have reduced characteristics when compared with optimized larger domains. The reduced characteristics include reduced brightness and if the parasitic domains are small enough diminished bistability of the cholesteric liquid crystal.

The dispersed domains have an average diameter of 2 to 30 microns, preferably 5 to 15 microns. The domains are dispersed in an aqueous suspension. The size ranges for the dried coating are varied as the mixture dries and the domains flatten.

By varying the amount of silica and copolymer relative to the liquid crystalline material, uniform domain size emulsions of the desired average diameter (by microscopy), can be produced. This process produces domains of a selected average diameter.

The resulting domains are flattened by the drying process and have on average a thickness substantially less than their length, preferably at least 50% less. More preferably, the domains on average have a thickness (depth) to length ratio of 1:2 to 1:10.

For optimal performance, a monolayer of coated droplets having a close-packed structure of uniform thickness is desired. Calculations by Yang and Mi (J. Phys. D: Appl. Phys. Vol. 33, page 672, 2000) have shown that for a chiral nematic liquid crystalline material of a given handedness, maximum reflectance is obtained if the thickness of the chiral nematic liquid crystal material between the electrodes is about ten times the pitch of the chiral nematic helix. For a green reflecting chiral nematic liquid crystal material with $\lambda_{max}$ of 550 nm and $n_{av}$ of 1.6 the pitch is 344 nm. Therefore, maximum reflectance is obtained for a 3.4 µm thick layer of this material. For chiral nematic liquid crystal materials that reflect in the red and near infrared portions of the spectrum, the pitch and therefore the thickness of the coated layer needed for maximum reflectance will be somewhat higher but even in these cases a thickness of about 5 µm is sufficient, if the refractive index is close to 1.6. In other words, increasing the thickness of the layer beyond this does not provide an increase in reflectance.

It is also well documented that the switching voltage increases linearly with thickness. Since it is desirable to have the lowest possible switching voltage, a uniform thickness of about 5 µm is most preferred for the coated layer of droplets, provided the droplets have a close-packed structure. Under certain conditions, for example, drying, monodisperse droplets of the light modulating material will spontaneously self-assemble on a surface into a hexagonal close-packed (HCP) structure. The process has been described in detail by Denkov et al. (Nature, vol. 361, p.26, 1993). When an aqueous suspension of droplets is spread on a surface, the droplets initially assume a random, disordered or uncorrelated distribution. However, as a function of drying, when the level of water reaches the top of the droplets, there is a strong attractive force known as the capillary force that drives the droplets into a close-packed ordered or correlated structure. The attractive energy of the capillary force is much greater than the thermal energy. However, it is important that lateral movement of droplets is not impeded by a strong attraction to the surface or by an increase in viscosity of the medium in which they are suspended. The latter would happen if the binder is gelatin and the coated layer of droplets is chill set prior to drying.

The formation of a close-packed structure in two dimensions, starting from a random distribution of droplets, is sometimes referred to as two-dimensional crystallization and should have a monodisperse population of droplets or a population of droplets having low polydispersity (Kumacheva et al. Physical Review Letters vol. 91, page. 1283010-1, 2003). A population of droplets of light modulating material having sufficiently low polydispersity to create a close-packed structure may be achieved by the limited coalescence process. The close-packed structure is readily observable under an optical microscope. Furthermore, the close-packed structure has a repeat pattern or periodicity wherein the repeat distance is of the order of the wavelength of visible light. A coating having such a pattern exhibits Fraunhofer diffraction when placed before a source of visible light such as a visible light laser. The phenomenon of Fraunhofer diffraction is described more fully by Lisensky et al. Journal of Chemical Education, vol. 68, February 1991.

For perfectly monodisperse droplets (cv less than 0.1), a hexagonal close-packed (HCP) structure is obtained. The diffraction pattern for such a structure is in the form of spots. If there is a minor level of polydispersity (cv between 0.1 and 0.2), the diffraction pattern of the close-packed structure is in the form of a single ring or a set of concentric rings.

A close-packed monolayer of uniform thickness may provide enhanced performance with respect to surface roughness. In conventional liquid crystal coatings containing non-uniform droplets or capsules, the root mean square (RMS) surface roughness has been measured at about 6 microns. This is a very high value of surface roughness that would result in irregular or incomplete curing if a ultraviolet curable screen printed conducive ink is used an electrode (conductive layer) in contact with the liquid crystal coating. The irregular curing will result in increased switching voltages. Furthermore, a surface roughness of this magnitude will also result in significant non-uniformity of switching voltage across the area of the display since the switching voltage is directly related to the thickness of the coated layer. The self-assembled droplets or domains in the present close-packed monolayer demonstrates a root mean square surface roughness of less than 1.5 microns, more preferably less than 1.0 microns and most preferably less than 0.5 microns.

In a most preferred embodiment, the close-packed monolayer structure of coated droplets is preserved after the coating has dried and the polymer latex particles comprising the binder have coalesced to form a film. This allows a second aqueous layer to be coated above the layer containing the light modulating material without disturbing the close-packed organization. In a preferred embodiment, the second aqueous layer functions as a the top electrode, that is, the electrode (conductive layer) on the side of the light modulating layer opposite the substrate, for the light modulating material.

A preferred embodiment of the display device shown in FIG. 1 comprises a clear flexible support 101 with a clear conducting layer 102. The imaging layer or light modulating layer (layer 1) contains a close-packed monolayer of droplets of the light modulating material 104 along with coalesced latex particles 103. The electrode (conductive layer) comprising electronically conductive polymers 107 is coated directly over the layer containing the light modulating material. In this embodiment, the electrically conductive layer comprising an electronically conductive polymer and a conductivity enhancing agent is located on the side of the electronically modulated imaging layer opposite the substrate and another electrically conductive layer, preferably a conventional conductive layer not containing electronically conductive polymer and a conductivity enhancing agent, is located between the electronically modulated imaging layer and the substrate.

Figure 2:
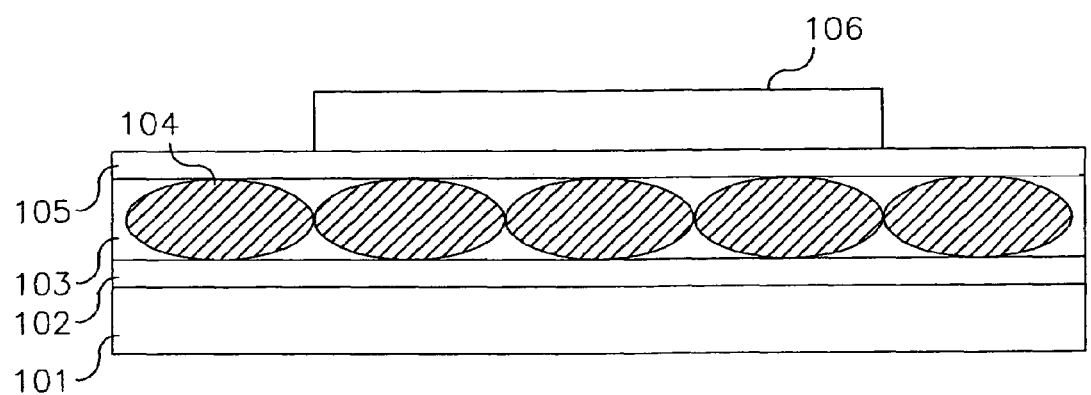
FIG. 2 illustrates a display based on the prior art which is a micrograph of close-packed mono-layer with uniform droplets of liquid crystal and polymer latex binder.

A display device of the prior art is shown in FIG. 2. It comprises a clear flexible support 101 with a clear conducting layer 102. The imaging layer or light modulating layer (layer 1) contains a close-packed monolayer of droplets of the light modulating material 104 along with coalesced latex particles 103. It further comprises a barrier layer of polymer in a helix configuration 105 and another electrode 106 made up of screen-printed carbon conductive ink. This device requires a higher switching voltage, as a result of increased thickness between the electrodes and air pockets at the interface between the non-aqueous latex layer and the aqueous protective layer, as compared to the device of FIG. 1.

In addition to binder and hardener, liquid crystal layers may also contain a small amount of light absorbing colorant, preferably an absorber dye. It is preferred that an absorbing dye is used to selectively absorb back scattered light from the focal conic state at the lowest wavelengths in the visible part of the spectrum. Further, the colorant selectively absorbs similarly scattered light from the planar state, while only minimally absorbing the main body of reflected light. The colorants may include both dyes and pigments. The colorant may absorb light components, which may cause turbidity of color in the color display performed by selective reflection of the liquid crystal or may cause lowering of a transparency in the transparent state of the liquid crystal, and therefore can improve the display quality. Two or more of the components in the liquid crystal display may contain a coloring agent. For example, both the polymer and the liquid crystal may contain the coloring agent. Preferably, a colorant is selected, which absorbs rays in a range of shorter wavelengths than the selective reflection wavelength of the liquid crystal.

Any amount of colorant may be used, provided that addition of the colorant does not remarkably impair the switching characteristics of the liquid crystal material for display. In addition, if the polymeric binder is formed by polymerization, the addition does not inhibit the polymerization. An exemplary amount of colorant is from at least 0.1 weight % to 5 weight % of the liquid crystal material.

In a preferred embodiment, the colorants, preferably absorber dyes, are incorporated directly in the chiral nematic liquid crystal materials. Any colorants that are miscible with the cholesteric liquid crystal materials are useful for this purpose. Most preferred are colorants that are readily soluble in toluene. By readily soluble is meant a solubility greater than 1 gram per liter, more preferably greater than 10 grams per liter and most preferably greater than 100 grams per liter. Toluene soluble dyes most compatible with the cholesteric liquid crystal materials are anthraquinone dyes such as Sandoplast Blue 2B from Clariant Corporation, phthalocyanine dyes such as Savinyl Blue GLS from Clariant Corporation or Neozapon Blue 807 from BASF Corporation, methine dyes such as Sandoplast Yellow 3G from Clariant Corporation or metal complex dyes such as Neozapon Yellow 157, Neozapon Orange 251, Neozapon Green 975, Neozapon Blue 807 or Neozapon Red 365 from BASF Corporation. Other colorants are Neopen Blue 808, Neopen Yellow 075, Sudan Orange 220 or Sudan Blue 670 from BASF Corporation. Other types of colorants may include various kinds of dyestuff such as dyestuff for resin coloring and dichromatic dyestuff for liquid crystal display. The dyestuff for resin coloring may be SPR REDI (manufactured by Mitsui Toatsu Senryo Co., Ltd.). The dichromatic dyestuff for liquid crystal is specifically SI-424 or M-483 (both manufactured by Mitsui Toatsu Senryo Co., Ltd.).

Another aspect of the present invention relates to a display sheet comprising a substrate, an electrically conductive layer formed over the substrate, and a liquid crystal containing imaging layer comprising a chiral nematic material formed by the above described methods disposed over the electrically conductive layer.

As used herein, the phrase a "liquid crystal display" (LCD) is a type of flat panel display used in various electronic devices. At a minimum, a liquid crystal devices comprises a substrate, at least one conductive layer and a liquid crystal layer. Liquid crystal devices may also comprise two sheets of polarizing material with a liquid crystal solution between the polarizing sheets. The sheets of polarizing material may comprise a substrate of glass or transparent plastic. The liquid crystal device may also include functional layers. In one embodiment of a liquid crystal device, a transparent, multi-layer flexible support is coated with a conductive layer, which may be patterned, onto which is coated the light modulating liquid crystal layer. Another conductive layer is applied and overcoated with a dielectric layer to which dielectric conductive row contacts are attached, including via holes that permit interconnection between conductive layers and the dielectric conductive row contacts. An optional nanopigmented functional layer may be applied between the liquid crystal layer and the other (second) conductive layer.

The liquid crystal (LC) is used as an optical switch. The substrates are usually manufactured with transparent, conductive electrodes, in which electrical "driving" signals are coupled. The driving signals induce an electric field which can cause a phase change or state change in the liquid crystal material, thus exhibiting different light reflecting characteristics according to its phase and/or state.

Cholesteric liquid crystals are bistable at zero field and drive schemes may be designed based on their response to voltage pulses.

The displays may employ any suitable driving schemes and electronics known to those skilled in the art, including the following, all of which are incorporated herein by reference in their entireties: Doane, J. W., Yang, D. K., *Front-lit Flat Panel Display from Polymer Stabilized Cholesteric Textures*, Japan Display 92, Hiroshima October 1992; Yang, D. K. and Doane, J. W., *Cholesteric Liquid Crystal/Polymer Gel Dispersion: Reflective Display Application*, SID Technical Paper Digest, Vol XXIII, May 1992, p. 759, et sea.; U.S. patent application Ser. No. 08/390,068, filed Feb. 17, 1995, entitled "Dynamic Drive Method and Apparatus for a Bistable Liquid Crystal Display" and U.S. Pat. No. 5,453,863.

A typical display in its simplest form comprises a sheet supporting a conventional polymer dispersed electrically modulated material. The sheet includes a substrate. Substrate can be made of a polymeric material, such as Kodak Estar film base formed of polyester plastic, and have a thickness of between 20 and 200 microns. For example, substrate can be a 80 micron thick sheet of transparent polyester. Other polymers, such as transparent polycarbonate, can also be used. Alternatively, substrate can be thin, transparent glass.

In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like; Structures having stacked imaging layers, however, are optional for providing additional advantages in some case.

The flexible plastic substrate can be any flexible self-supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post manufacturing conditions such as in a process line of a displays manufacturer. Certain of the plastic substrates discussed below can withstand higher processing temperatures of up to at least about 200° C., some up to 300-350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl (x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene) fluoropolymer (PETFE), and poly (methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan, Zeanor T made by Zeon Chemicals L.P., Tokyo Japan, and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec". Lintec contains ultraviolet cured polyester acrylate and colloidal silica. When deposited on Arton, it has a surface composition of 35 atom % C, 45 atom % 0, and 20 atom % Si, excluding hydrogen. Another particularly preferred hard coating is the acrylic coating sold under the trademark "Terrapin" by Tekra Corporation, New Berlin, Wisconsin. The substrate used may also be a removable substrate.

The display contains one conductive layer. Preferably, there is also at least one other conductive layer. The conductive layers may be placed directly in contact with the light modulating layer. Alternatively any number of other layers may be placed intervening the light modulating layer and the conductive layer. However, care should be taken to ensure that the placement of the intervening layer does not significantly deteriorate the electrical performance of the device, such as requiring higher electrical field to switch the liquid crystal device.

In one preferred embodiment, the conductive layer comprises electronically conductive polymers and is preferably coated over the layer containing the light modulating material, on the side of the light modulating material opposite the substrate or applied on the side of the light modulating layer away from the other conductive layer(s), from a preferably aqueous coating composition. Suitable electronically conductive polymers are those with conjugated backbones, such as those disclosed in U.S. Pat. Nos. 6,025,119, 6,060,229, 6,077,655, 6,096,491, 6,124,083, 6,162,596, 6,187,522, and 6,190,846, incorporated herein in by reference. These electronically conductive polymers include substituted or unsubstituted aniline-containing polymers as disclosed in U.S. Pat. Nos. 5,716,550, 5,093,439 and 4,070,189), substituted or unsubstituted thiophene-containing polymers as disclosed in U.S. Pat. Nos. 5,300,575, 5,312,681, 5,354,613, 5,370,981, 5,372,924, 5,391,472, 5,403,467, 5,443,944, 5,575,898, 4,987,042 and 4,731,408, incorporated herein in by reference, substituted or unsubstituted pyrrole-containing polymers as disclosed in U.S. Pat. Nos. 5,665,498 and 5,674,654, incorporated herein in by reference, and poly(isothianaphthene) or derivatives thereof. These conducting polymers may be soluble or dispersible in organic solvents or water or mixtures thereof. Preferred conducting polymers for the present invention include pyrrole-containing polymers, aniline-containing polymers and thiophene-containing polymers. More preferred in the list is electronically conductive polythiophene, preferably polythiophene present in a cationic form with a polyanion. Typically, these polymers are dispersible in aqueous medium because of the presence of the polyanion, and hence, are environmentally desirable.

A preferred electronically conductive polythiophene is prepared by the oxidative polymerization of 3,4-dialkoxythiophene or 3,4-alkylenedioxythiophene in the presence of a polyanion. The most preferred electronically conductive polymers include poly(3,4-ethylene dioxythiophene styrene sulfonate) which comprises poly(3,4-ethylene dioxythiophene) in a cationic form with polystyrenesulfonic acid. The advantage of choosing the polymer arises from the fact that it is primarily water based, stable polymer structure to light and heat, stable dispersion and cause minimum concern for storage, health, environmental and handling.

Preparation of the polythiophene based polymers has been discussed in detail in a publication titled "Poly(3,4-ethylenedioxythiophene) and its derivatives: past, present and future" by L. B. Groenendaal, F. Jonas, D. Freitag, H. Pielartzik and J. R. Reynolds in Advanced Materials, (2000), 12, No. 7, pp. 481-494, and references therein.

In a preferred embodiment, the electronically conductive polymer comprises:

a) a polythiophene according to Formula I

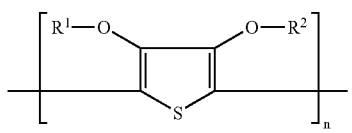

I in a cationic form, wherein each of R1 and R2 independently represents hydrogen or a C1-4 alkyl group or together represent an optionally substituted C1-4 alkylene group or a cycloalkylene group, preferably an ethylene group, an optionally alkyl-substituted methylene group, an optionally C1-12 alkyl- or phenyl-substituted 1,2-ethylene group, a 1,3-propylene group or a 1,2-cyclohexylene group; and n is 3 to 1000;

and b) a polyanion compound;

Polyanions used with these electronically conductive polymers include the anions of polymeric carboxylic acids such as polyacrylic acids, poly(methacrylic acid), and poly(maleic acid), and polymeric sulfonic acids such as polystyrenesulfonic acids and polyvinylsulfonic acids, the polymeric sulfonic acids being preferred for use in this invention because of its stability and availability in large scale. These polysulfonic acids may also be copolymers formed from vinylsulfonic acid monomers copolymerized with other polymerizable monomers such as the esters of acrylic acid and styrene. The molecular weight of the polyacids providing the polyanions preferably is 1,000 to 2,000,000 and more preferably 2,000 to 500,000. The polyacids or their alkali salts are commonly available, for example as polystyrenesulfonic acids and polyacrylic acids, or they may be produced using known methods. Instead of the free acids required for the formation of the electrically conducting polymers and polyanions, mixtures of alkali salts of polyacids and appropriate amounts of monoacids may also be used. The polythiophene to polyanion weight ratio can widely vary between 1:99 to 99:1, however, optimum properties such as high electrical conductivity and dispersion stability and coatability are obtained between 85:15 and 15:85, and more preferably between 50:50 and 15:85. The most preferred electronically conductive polymers include poly(3,4-ethylene dioxythiophene styrene sulfonate) which comprises poly(3,4-ethylene dioxythiophene) in a cationic form and polystyrenesulfonic acid.

Particularly suitable electronically conductive polymer layers are those comprising polythiophene with a figure of merit (FOM) of <150, preferably <100, and more preferably <50, as described in U.S. Ser. Nos. 10/944,570 and 10/969,889. Another type of conductive material that can be preferably used in the conductive layer includes carbon nanotubes such as single wall or multiwall carbon nanotubes.

Desirable results such as enhanced conductivity of the polythiophene layer can be accomplished by incorporating a conductivity enhancing agent (CEA). Preferred conductivity enhancing agents are organic compounds containing dihydroxy, poly-hydroxy, carboxyl, amide, or lactam groups, such as (1) those represented by the following Formula II:

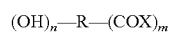 II wherein m and n are independently an integer of from 1 to 20, R is an alkylene group having 2 to 20 carbon atoms, an arylene group having 6 to 14 carbon atoms in the arylene chain, a pyran group, or a furan group, and X is —OH or —NYZ, wherein Y and Z are independently hydrogen or an alkyl group; or (2) a sugar, sugar derivative, polyalkylene glycol, or glycerol compound; or (3) those selected from the group consisting of N-methylpyrrolidone, pyrrolidone, caprolactam, N-methyl caprolactam, dimethyl sulfoxide or N-octylpyrrolidone; or (4) a combination of the above.

Particularly preferred conductivity enhancing agents are: sugar and sugar derivatives such as sucrose, glucose, fructose, lactose; sugar alcohols such as sorbitol, mannitol; furan derivatives such as 2-furancarboxylic acid, 3-furancarboxylic acid and alcohols. Ethylene glycol, glycerol, di- or triethylene glycol are most preferred because they provide the maximum conductivity enhancement.

The conductivity enhancing agent can be incorporated by any suitable method. Preferably the conductivity enhancing agent is added to the coating composition comprising the polythiophene. Alternatively, the coated polythiophene containing layer can be exposed to the conductivity enhancing agent by any suitable method, such as post-coating wash.

The concentration of the conductivity enhancing agent in the coating composition may vary widely depending on the particular organic compound used and the conductivity requirements. However, convenient concentrations that may be effectively employed in the practice of the present invention are about 0.5 to about 25 weight %; more conveniently 0.5 to 10 and more desirably 0.5 to 5 as it is the minimum effective amount.

The liquid crystal device preferably also contains at least another conductive layer in addition to the conductive layer comprising electronically conductive polymers. This additional layer or layers may also comprise electronically conductive polymers, but may also be made of conventional conductive layer materials. The other conductive layer or layers desirably have sufficient conductivity to carry a field across the light modulating layer.

One conventional conductive layer which may be used with the present invention typically is comprised of a primary metal oxide and is preferably transparent. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation. In addition to the primary oxide such as indium tin oxide, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.) Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$--$In_2O_3$, or $TaO_3$. The conductive layer may be formed, for example, by a low temperature sputtering technique or by a direct current sputtering technique, such as DC sputtering or RF-DC sputtering, depending upon the material or materials of the underlying layer. The conductive layer may be a transparent, electrically conductive layer of tin oxide or indium tin oxide (ITO), or polythiophene (PEDOT). Typically, the conductive layer is sputtered onto the substrate to a resistance of less than 250 Ohms per square. Alternatively, conductive layer may be an opaque electrical conductor formed of metal such as copper, aluminum or nickel. If the conductive layer is an opaque metal, the metal can be a metal oxide to create a light absorbing conductive layer.

Indium tin oxide (ITO) is the preferred conductive material, as it is a cost effective conductor with good environmental stability, up to 90% transmission, and down to 20 Ohms per square resistivity. An exemplary preferred indium tin oxide layer has a % T greater than or equal to 80% in the visible region of light, that is, from greater than 400 nm to 700 nm, so that the film will be useful for display applications. In a preferred embodiment, the conductive layer comprises a layer of low temperature indium tin oxide, which is polycrystalline. The indium tin oxide layer is preferably 10-120 nm in thickness, or 50-100 nm thick to achieve a resistivity of 20-60 Ohms/square on plastic. An exemplary preferred indium tin oxide layer is 60-80 nm thick. The light modulating material is coated over patterned indium tin oxide conductor to provide a polymer dispersed cholesteric coating having a dried thickness of less than 50 microns, preferably less than 25 microns, more preferably less than 15 microns, most preferably less than about 10 microns.

The conductive layer is preferably patterned. The conductive layer is preferably patterned into a plurality of electrodes. The patterned electrodes may be used to form a liquid crystal device. In another embodiment, two conductive substrates are positioned facing each other and cholesteric liquid crystals are positioned there between to form a device. The patterned indium tin oxide conductive layer may have a variety of dimensions. Exemplary dimensions may include line widths of 10 microns, distances between lines, that is, electrode widths, of 200 microns, depth of cut, that is, thickness of indium tin oxide conductor, of 100 nanometers. Indium tin oxide thicknesses on the order of 60, 70, and greater than 100 nanometers are also possible.

In a typical matrix-addressable light emitting display device, numerous light emitting devices are formed on a single substrate and arranged in groups in a regular grid pattern. Activation may be by rows and columns, or in an active matrix with individual cathode and anode paths. OLEDs are often manufactured by first depositing a transparent electrode on the substrate, and patterning the same into electrode portions. The organic layer(s) is then deposited over the transparent electrode. A metallic electrode can be formed over the electrode layers. For example, in U.S. Pat. No. 5,703,436 to Forrest et al., incorporated herein by reference, transparent indium tin oxide (ITO) is used as the Hole injecting electrode, and a Mg--Ag--ITO electrode layer is used for electron injection.

In addition to a second conductive layer, other means may be used to produce a field capable of switching the state of the liquid crystal layer as described in, for example, U.S. Pat Appl. Nos. 20010008582 A1, 20030227441 A1, 20010006389 A1, and U.S. Pat. Nos. 6,424,387, 6,269,225, and 6,104,448, all incorporated herein by reference.

For higher conductivities, the other conductive layer(s) may comprise a silver based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the other conductive layer or layers comprise at least one of gold, silver and a gold/silver alloy, for example, a layer of silver coated on one or both sides with a thinner layer of gold. See, Int. Publ. No. WO 99/36261 by Polaroid Corporation. In another embodiment, the other conductive layer or layers may comprise a layer of silver alloy, for example, a layer of silver coated on one or both sides with a layer of indium cerium oxide (InCeO). See U.S. Pat. No. 5,667,853, incorporated herein in by reference.

These other conductive layers may be patterned irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference.

In one embodiment, the other conductors are a printed conductive ink such as ELECTRODAG 423SS screen printable electrical conductive material from Acheson Corporation. Such printed materials are finely divided graphite particles in a thermoplastic resin. These conductors are formed using printed inks to reduce display cost. The use of a flexible support for substrate layer, laser etched conductive layer, machine coating polymer dispersed cholesteric layer, and printing other conductors permit the fabrication of very low cost memory displays. Small displays formed using these methods can be used as electronically rewritable transaction cards for inexpensive, limited rewrite applications.

A light absorbing conductor may be positioned on the side opposing the incident light. In the fully evolved focal conic state the cholesteric liquid crystal is transparent, passing incident light, which is absorbed by absorbing conductor to provide a black image. Progressive evolution to the focal conic state causes a viewer to see an initial bright reflected light that transitions to black as the cholesteric material changes from planar state to a fully evolved focal conic state. The transition to the light transmitting state is progressive, and varying the low voltage time permits variable levels of reflection. These variable levels can be mapped out to corresponding gray levels, and when the field is removed, light modulating layer maintains a given optical state indefinitely. The states are more fully discussed in U.S. Pat. No. 5,437,811.

In the most preferred embodiment, the electronically conductive polymer layer is formed on the side of the liquid crystal layer opposite the substrate. In this embodiment, another conductor is located between the substrate and the liquid crystal layer and on the side opposite the electronically conductive polymer layer. In devices of the prior art, the electronically conductive polymer layer would be considered the second conductor or conductive layer.

The liquid crystal device may also comprise at least one "functional layer" between the conductive layer and the substrate. The functional layer may comprise a protective layer or a barrier layer. The protective layer useful in the practice of the invention can be applied in any of a number of well known techniques, such as dip coating, rod coating, blade coating, air knife coating, gravure coating and reverse roll coating, extrusion coating, slide coating, curtain coating, and the like. The liquid crystal particles and the binder are preferably mixed together in a liquid medium to form a coating composition. The liquid medium may be a medium such as water or other aqueous solutions in which the hydrophilic colloid are dispersed with or without the presence of surfactants. A preferred barrier layer may acts as a gas barrier or a moisture barrier and may comprise $SiO_x$, $AlO_x$ or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. In another embodiment of this invention, the antistatic layer has a surface resistivity of between $10^5$ to $10^{12}$ Ohms/sq. Above $10^{12}$ Ohms/sq., the antistatic layer typically does not provide sufficient conduction of charge to prevent charge accumulation to the point of preventing fog in photographic systems or from unwanted point switching in liquid crystal displays. While layers greater than $10^5$ Ohms/sq. will prevent charge buildup, most antistatic materials are inherently not that conductive and in those materials that are more conductive than $10^5$ Ohms/sq., there is usually some color associated with them that will reduce the overall transmission properties of the display. The antistatic layer is separate from the highly conductive layer of indium tin oxide and provides the best static control when it is on the opposite side of the web substrate from that of the indium tin oxide layer. This may include the web substrate itself.

Another type of functional layer may be a color contrast layer. Color contrast layers may be radiation reflective layers or radiation absorbing layers. In some cases, the rearmost substrate of each display may preferably be painted black. The color contrast layer may also be other colors. In another embodiment, the dark layer comprises milled nonconductive pigments. The materials are milled below 1 micron to form "nanopigments". In a preferred embodiment, the dark layer absorbs all wavelengths of light across the visible light spectrum, that is from 400 nanometers to 700 nanometers wavelength. The dark layer may also contain a set or multiple pigment dispersions. Suitable pigments used in the color contrast layer may be any colored materials, which are practically insoluble in the medium in which they are incorporated. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolopyrrole, and thioindigo, and anthriquinone pigments such as anthrapyrimidine.

The functional layer may also comprise a dielectric material. A dielectric layer, for purposes of the present invention, is a layer that is not conductive or blocks the flow of electricity. This dielectric material may include a ultraviolet curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged. The dielectric material may form an adhesive layer to subsequently bond a conductive layer to the light modulating layer.

The liquid crystal containing composition of the invention can be applied by any of a number of well known techniques, such as dip coating, rod coating, blade coating, air knife coating, slide (or bead) coating, curtain coating, and the like.

After coating, the layer is generally dried by simple evaporation, which may be accelerated by known techniques such as convection heating. Known coating and drying methods are described in further detail in Research Disclosure No. 308119, Published December 1989, pages 1007 to 1008, incorporated herein by reference.

A coated sheet can be formed using inexpensive, efficient layering methods. A single large volume of sheet material can be coated and formed into various types of smaller sheets for use in display devices such as transaction cards, shelf labels, large format signage, and the like. Displays in the form of sheets in accordance with the present invention are inexpensive, simple, and fabricated using low cost processes.

In the preferred embodiment, the imaging layer or light modulating layer is first applied and allowed to dry to form a self-assembled close-packed monolayer of droplets of the light modulating material in a film of coalesced latex particles. An aqueous layer containing an electronically conductive polymer is then applied. In a preferred commercial embodiment, the substrate to be coated is in the form of a moving web. After completing the manufacture of a coated liquid crystal sheet material between spaced electrodes (conductive layers), the sheet material can be cut into a plurality of smaller, individual areas for use in various display or other applications.

The following examples are provided to illustrate the invention.

EXAMPLE 1 (INVENTION)

A chiral nematic composition with center wavelength of reflection (CWR) of 590 nm was prepared by adding the appropriate amount of a high twist chiral dopant to the nematic host mixture BL087 obtained from Merck, Darmstadt, Germany.

A dispersion of the cholesteric liquid crystal composition with CWR at 590 nm was prepared as follows. To 502 grams of distilled water was added 7.5 grams of Ludox TM colloidal silica suspension and 15.5 grams of a 10% w/w aqueous solution of a copolymer of methylaminoethanol and adipic acid. To this was added 225 grams of the cholesteric liquid crystal composition. The mixture was stirred using a Silverson mixer at 5000 rpm. It was then passed through a microfluidizer at 3000 psi. Finally, the resulting dispersion was passed through a 23 μm filter. The droplet size distribution in the dispersion was measured using a Coulter Counter. It was found that the mean size was 9.5 microns and the coefficient of variation (cv) was 0.14.

The above dispersion was mixed with an aqueous suspension of polyurethane polymer latex NeoRez R-9249 from NeoResins, Wilmington Mass., USA and a solution of Olin 10 G in water to give a coating composition containing 15% w/w cholesteric liquid crystal material, 5.0% polymer latex and 0.1% Olin 10 G. The composition was spread over a plastic support with a thin layer of indium tin oxide (ITO) to give a uniform coverage of about 5400 mg/M$^2$ of cholesteric liquid crystal material. The plastic support (DuPont ST504) with sputter coated indium tin oxide conductive layer (300 Ohm/sq resistivity) was obtained from Bekaert. The thickness of the indium tin oxide layer is approximately 240 Angstroms. During the operation, the plastic support was placed over a coating block that was maintained at room temperature (23° C.) and the coating composition was also delivered or applied at the same temperature. The resulting coating was then dried under ambient conditions (23° C.)

A composition containing 4% diethylene glycol, 1% poly (3,4-ethylene dioxythiophene styrene sulfonate), obtained from H. C. Starck as Baytron P HC, and 95% water was then applied over the above coating. The resulting coated structure was then baked at 60° C. for 1 hr. Examination of the final coated structure by optical microscopy showed a very uniform close-packed organization of liquid crystal droplets. The close-packed organization had not been disturbed when the poly(3,4-ethylene dioxythiophene styrene sulfonate)containing layer had been applied over it.

The electro-optic response of the device was then obtained. The addressing pulse was a square wave with a frequency of 250 Hz and duration of 100 milliseconds. It was found that a voltage pulse higher than 66 volts was needed to switch the display into the reflecting state and a voltage pulse between 32 and 46 volts switched the display into the weakly scattering or dark state. Voltages less than 8 volts did not influence the state of the display

EXAMPLE 2 (CONTROL)

A chiral nematic composition with center wavelength of reflection (CWR) of 590 nm was prepared by adding the appropriate amount of a high twist chiral dopant to the nematic host mixture BL087 obtained from Merck, Darmstadt, Germany.

A dispersion of the cholesteric liquid crystal composition with CWR at 590 nm was prepared as follows. To 502 grams of distilled water was added 7.5 grams of Ludox TM colloidal silica suspension and 15.5 grams of a 10% w/w aqueous solution of a copolymer of methylaminoethanol and adipic acid. To this was added 225 grams of the cholesteric liquid crystal composition. The mixture was stirred using a Silverson mixer at 5000 rpm. It was then passed through a microfluidizer at 3000 psi. Finally, the resulting dispersion was passed through a 23 μm filter. The droplet size distribution in the dispersion was measured using a Coulter Counter. It was found that the mean size was 9.5 microns and the coefficient of variation (cv) was 0.14.

The above dispersion was mixed with an aqueous suspension of polyurethane polymer latex NeoRez R-9249 from NeoResins, Wilmington Mass., USA and a solution of Olin 10 G in water to give a coating composition containing 15% w/w cholesteric liquid crystal material, 5.0% polymer latex and 0.1% Olin 10 G. The composition was spread over a plastic support with a thin layer of indium tin oxide (ITO) to give a uniform coverage of about 5400 mg/m$^2$ of cholesteric liquid crystal material. The plastic support (DuPont ST504) with sputter coated indium tin oxide conductive layer (300 Ohm/sq resistivity) was obtained from Bekaert. The thickness of the indium tin oxide layer is approximately 240 Angstroms. During the operation, the plastic support was placed over a coating block that was maintained at room temperature (23° C.) and the coating composition was also delivered or applied at the same temperature. The resulting coating was then dried under ambient conditions (23° C.)

A composition containing 1% poly(3,4-ethylene dioxythiophene styrene sulfonate), obtained from H. C. Starck as Baytron P HC, and 95% water was then applied over the above coating. The resulting coated structure was then baked at 60° C. for 1 hr. Examination of the final coated structure by optical microscopy showed a very uniform close-packed organization of liquid crystal droplets. The close-packed organization had not been disturbed when the poly(3,4-ethylene dioxythiophene styrene sulfonate)containing layer had been applied over it. However, there appeared to be bubbles and other disturbances at the interface between the hydrophobic polymer matrix of the liquid crystal layer and the aqueous-based conductive layer, making the coated structure unacceptable It was found that the voltage needed to switch the display was extremely high.

EXAMPLE 3 (CONTROL)

Example 3 demonstrates the results achieved when coating or printing a conductive layer onto a liquid crystal layer, with a barrier layer, resulting in increased thickness, to protect the liquid crystal layer from the carrier solvent for the conductive layer.

A chiral nematic composition with center wavelength of reflection (CWR) of 590 nm was prepared by adding the appropriate amount of a high twist chiral dopant to the nematic host mixture BL087 obtained from Merck, Darmstadt, Germany.

A dispersion of the cholesteric liquid crystal composition with CWR at 590 nm was prepared as follows. To 502 grams of distilled water was added 7.5 grams of Ludox TM colloidal silica suspension and 15.5 grams of a 10% w/w aqueous solution of a copolymer of methylaminoethanol and adipic acid. To this was added 225 grams of the cholesteric liquid crystal composition. The mixture was stirred using a Silverson mixer at 5000 rpm. It was then passed through a microfluidizer at 3000 psi. Finally, the resulting dispersion was passed through a 23 μm filter. The droplet size distribution in the dispersion was measured using a Coulter Counter. It was found that the mean size was 9.5 microns and the coefficient of variation (cv) was 0.14.

The above dispersion was mixed with an aqueous suspension of polyurethane polymer latex NeoRez R-967 from NeoResins, Wilmington Mass., USA and a solution of coating aid Olin 10 G in water to give a coating composition containing 15% w/w cholesteric liquid crystal material, 5.0% polymer latex and 0.1% Olin 10 G. The composition was spread over a plastic support with a thin layer of indium tin oxide (ITO) using a coating knife with 0.008 cm gap. The plastic support (Dupont ST504) with a sputter coated indium tin oxide conductive layer (300 Ohm/sq resistivity) was obtained from Bekaert. The thickness of the indium tin oxide layer is approximately 240 Angstroms. During the operation, the plastic support was placed over a coating block that was maintained at room temperature (23° C.) and the coating composition was also delivered or applied at the same temperature. The resulting coating was then dried under ambient conditions (23° C.).

The coating was then placed on a coating block that was maintained at 23° C. A composition containing 4% Type IV cattle gelatin and 0.1% Aerosol OT in distilled water was then spread over it using a coating knife with 0.008 cm gap to constitute the protective/barrier overcoat. The coating was dried at 23° C. For this top layer or protective overcoat, the temperature of the coating block and the drying temperature were both below the sol-gel transition temperature of the binder.

A carbon-based conductive ink (Electrodag 423SS from Acheson Corporation) was then screen printed over the protective overcoat to complete the construction of the display device. The electro-optic response of the device was then obtained. The addressing pulse was a square wave with a frequency of 250 Hz and duration of 100 milliseconds.

It was found that a voltage pulse higher than 138 volts was needed to switch the display into the reflecting state and a voltage pulse between 64 and 86 switched the display into the weakly scattering or dark state. Voltages less than 12 volts did not influence the state of the display. It is clear that the voltage needed to switch the display into the reflecting state was significantly greater than that of the invention device.

EXAMPLE 4 (CONTROL)

Example 4 demonstrates the results achieved when coating or printing a conductive layer onto a liquid crystal layer.

A chiral nematic composition with center wavelength of reflection (CWR) of 590 nm was prepared by adding the appropriate amount of a high twist chiral dopant to the nematic host mixture BL087 obtained from Merck, Darmstadt, Germany.

A dispersion of the cholesteric liquid crystal composition with CWR at 590 nm was prepared as follows. To 502 grams of distilled water was added 7.5 grams of Ludox TM colloidal silica suspension and 15.5 grams of a 10% w/w aqueous solution of a copolymer of methylaminoethanol and adipic acid. To this was added 225 grams of the cholesteric liquid crystal composition. The mixture was stirred using a Silverson mixer at 5000 rpm. It was then passed through a microfluidizer at 3000 psi. Finally, the resulting dispersion was passed through a 23 μm filter. The droplet size distribution in the dispersion was measured using a Coulter Counter. It was found that the mean size was 9.5 microns and the coefficient of variation (cv) was 0.14.

The above dispersion was mixed with an aqueous suspension of polyurethane polymer latex NeoRez R-9249 from NeoResins, Wilmington Mass., USA and a solution of Olin 10 G in water to give a coating composition containing 15% w/w cholesteric liquid crystal material, 5.0% polymer latex and 0.1% Olin 10 G. The composition was spread over a plastic support with a thin layer of indium tin oxide (ITO) to give a uniform coverage of about 5400 mg/m$^2$ of cholesteric liquid crystal material. The plastic support (DuPont ST504) with sputter coated indium tin oxide conductive layer (300 Ohm/sq resistivity) was obtained from Bekaert. The thickness of the indium tin oxide layer is approximately 240 Angstroms. During the operation the, plastic support was placed over a coating block that was maintained at room temperature (23° C.) and the coating composition was also delivered or applied at the same temperature. The resulting coating was then dried under ambient conditions (23° C.)

A carbon-based conductive ink (Electrodag 423SS from Acheson Corporation) was then screen printed over the liquid crystal layer to complete the construction of the display device.

No electro-optic response of the device was obtained, as the coated layer of Electrodag 423SS damaged the liquid crystal layer.

The invention has been described in detail with particular reference to certain preferred embodiments thereof, but it will be understood that variations and modifications can be effected within the spirit and scope of the invention.

The invention claimed is:

1. A display comprising at least one substrate and at least one electronically modulated imaging layer and at least one electrically conductive layer, wherein said electronically modulated imaging layer comprises a self-assembled, close-packed, ordered monolayer of domains of electrically modulated material in a water insoluble, hydrophobic polymer matrix and said at least one electrically conductive layer comprises electronically conductive polymer and a conductivity enhancing agent.

2. The display of claim 1 wherein said at least one electronically modulated imaging layer comprises a chiral nematic liquid crystal material.

3. The display of claim 1 wherein said self-assembled, close-packed, ordered monolayer of domains of electrically modulated material in a water insoluble, hydrophobic polymer matrix is a hexagonally closest packed ordered monolayer of domains.

4. The display of claim 1 wherein said self-assembled, close-packed, ordered monolayer of domains of electrically modulated material in a water insoluble, hydrophobic polymer matrix has a thickness of from 4-6 μm.

5. The display of claim 1 wherein said self-assembled, close-packed, ordered monolayer of domains of electrically modulated material demonstrate a root mean square surface roughness of less than 1.5 microns.

6. The display of claim 1 wherein said water insoluble, hydrophobic polymer matrix comprises polymer latex.

7. The display of claim 1 wherein said water insoluble, hydrophobic polymer matrix comprises polyurethane latex.

8. The display of claim 1 wherein said water insoluble, hydrophobic polymer matrix comprises at least one latex selected from the group consisting of urethane, styrene, esters of alpha-methylene aliphatic mono-carboxylic acids, and vinylidene halides.

9. The display of claim 1 wherein said water insoluble, hydrophobic polymer matrix comprises aqueous suspensions of polyesters, polyolefins or combinations thereof.

10. The display of claim 1 wherein said water insoluble, hydrophobic polymer matrix further comprises a surfactant.

11. The display of claim 1 wherein said electronically conductive polymer comprises polythiophene.

12. The display of claim 1 wherein said electronically conductive polymers are substituted or unsubstituted aniline-containing polymers, substituted or unsubstituted thiophene-containing polymers, or substituted or unsubstituted pyrrole-containing polymers.

13. The display of claim 1 wherein said electrically conductive layer may be an opaque layer.

14. The display of claim 1 wherein said electrically conductive layer may be a light absorbing conductive layer.

15. The display of claim 1 wherein said conductivity enhancing agent is diethylene glycol.

16. The display of claim 1 wherein said conductivity enhancing agent is at least one member selected from the group consisting of N-methylpyrrolidone, pyrrolidone, dimethyl sulfoxide, ethylene glycol, glycerol, diethylene glycol and triethylene glycol.

17. The display of claim 1 wherein said substrate is removable.

18. The display of claim 1 wherein said at least one electrically conductive layer comprising an electronically conductive polymer and a conductivity enhancing agent is located on the side of said electronically modulated imaging layer opposite said substrate and further comprising another electrically conductive layer located between said electronically modulated imaging layer and said substrate.

19. The display of claim 18 wherein said another electrically conductive layer comprises indium tin oxide (ITO).

* * * * *